United States Patent [19]

Yagami et al.

[11] Patent Number: 4,592,586
[45] Date of Patent: Jun. 3, 1986

[54] AUTOMOBILE ROOF STRUCTURE

[75] Inventors: Kouichi Yagami, Zama; Kiyoto Matsuzaki, Yokohama, both of Japan

[73] Assignee: Nissan Motor Co., Ltd., Yokohama, Japan

[21] Appl. No.: 597,382

[22] Filed: Apr. 6, 1984

[30] Foreign Application Priority Data

Apr. 9, 1983 [JP] Japan ................................. 58-62732

[51] Int. Cl.[4] ............................................... B60J 7/18
[52] U.S. Cl. ...................... 296/218; 49/476; 296/213
[58] Field of Search ........................ 296/218, 216, 213; 49/476

[56] References Cited

U.S. PATENT DOCUMENTS 4,375,899 3/1983 Kajiyama et al. ................... 296/216

FOREIGN PATENT DOCUMENTS 55-68618 5/1980 Japan .
55-163278 11/1980 Japan .

*Primary Examiner*—Robert R. Song
*Attorney, Agent, or Firm*—Schwartz, Jeffery, Schwaab, Mack, Blumenthal & Evans

[57] ABSTRACT

A car roof structure includes a frame flange protruding nearly perpendicularly from the top surface of the front, rear, and side roof rails that surround the edges of the ceiling of the car space. A weather strip is attached around the frame flange for enabling it to make a snug contact with the bottom surface of a roof panel which, covering the roof rails, is allowed to be put on and taken off at will.

Installing brackets are provided on the interior side of the front roof rail and the rear roof rail to have the roof panel fixed onto the roof rails by hooking a plurality of catch handles which are provided on the bottom surface of the roof panel to the installing brackets.

3 Claims, 8 Drawing Figures

_AUTOMOBILE ROOF STRUCTURE_

BACKGROUND OF THE INVENTION

The present invention relates to an automobile roof structure, more particularly, to a roof structure which is adapted for installing and demounting the roof panel as a whole.

Referring to FIGS. 1, 2, and 3, there is shown a roof structure of an automobile with a usual movable sun roof 2, in which a sun roof frame 8 is fixed to an opening end portion 6 of a roof panel 4. A weather strip 12 is attached to the inner periphery side wall 10 of the sun roof frame 8, and the rain water that accumulates in the gutter 14 around the sun roof frame 8 is removed to outside of the automobile via a drain hose 16.

However, in such a usual frame structure, there naturally exists a limit on the size of the sun roof 2 due to the arrangement wherein the sun roof frame 8 is situated in the rear of a front roof rail 18 or a side roof rail 19. This results in drawbacks such as a rather high manufacturing cost because of the complicated structure necessitated by the use of a sun roof frame 8 or a drain hose 16.

SUMMARY OF THE INVENTION

It is an object of the present invention to provide an automobile roof structure which allows an increase in the available sun roof area.

It is another object of the present invention to provide a simple and inexpensive roof structure which allows the roof panel to be removable as a whole.

It is a further object of the present invention to provide a roof structure which alllows to insure a sufficient head clearance.

Briefly described, these and other objects of the present invention are accomplished by an improved roof structure which includes a frame flange protruding nearly perpendicularly from the top surface of the front, rear, and side roof rails that surround the edges of the ceiling of the car space. A weather strip is attached around the frame flange for enabling it to make a snug contact with the bottom surface of a sun roof which, covering said roof rails, is allowed to be put on and taken off at will.

BRIEF DESCRIPTION OF THE DRAWINGS

These and other objects, features, and advantages of the present invention will be more apparent from the following description of a preferred embodiment, taken in conjunction with the accompanying drawings, in which.

DESCRIPTION OF THE PREFERRED EMBODIMENTS

Figure 1:
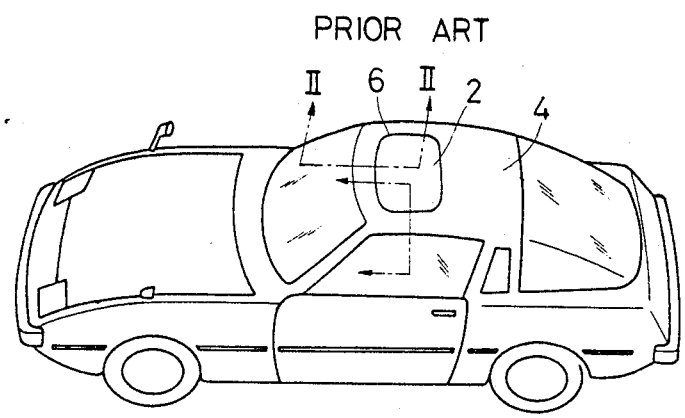
FIG. 1 is a perspective view of an automobile with a prior art sun roof.
Figure 2:
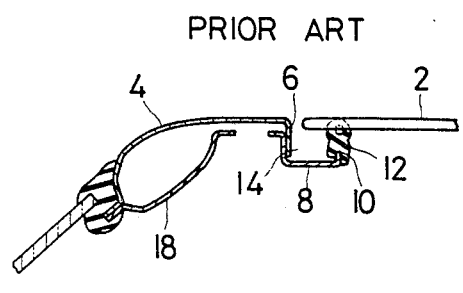
FIG. 2 is a cross sectional view taken along the line II—II of FIG. 1.
Figure 3:
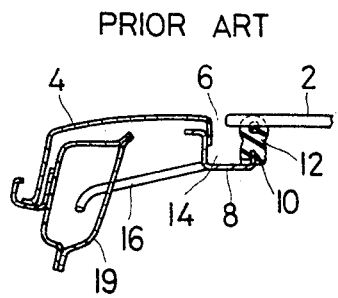
FIG. 3 is a cross sectional view taken along the line III—III of FIG. 1.
Figure 4:
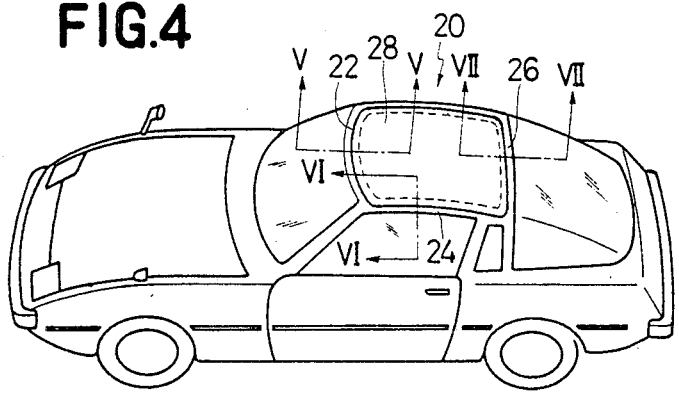
FIG. 4 is a perspective view of an automobile with a roof structure embodying the present invention.
Figure 5:
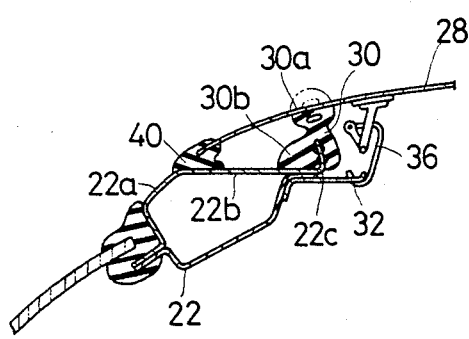
FIG. 5 is a cross sectional view taken along the line V—V of FIG. 4.
Figure 6:
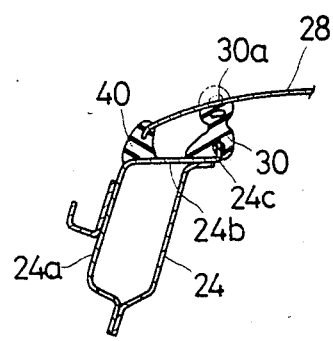
FIG. 6 is a cross sectional view taken along the line VI—VI of FIG. 4.
Figure 7:
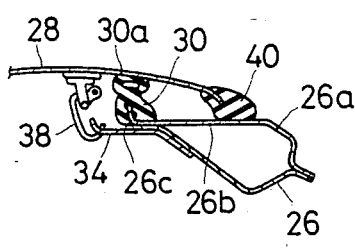
FIG. 7 is a cross sectional view taken along the line VII—VII of FIG. 4.
Figure 8:
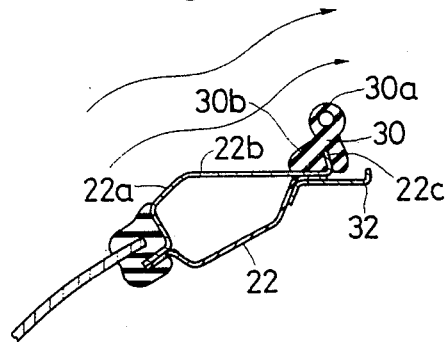
FIG. 8 is a cross-sectional view of the roof structure as shown in FIG. 5 for the state wherein the roof panel is taken off.

Referring to FIGS. 4–8, a roof structure embodying the present invention is designated by the reference numeral 20. In the roof structure, each of the front roof rail 22, the side roof rails 24, and the rear roof rail 26 has a cross section in the form of a closed loop and the top wall sections 22$b$, 24$b$, and 26$b$ of each of these loops adjoining the outer panel sections 22$a$, 24$a$, and 26$a$, respectively, are bent approximately horizontally toward the center of the roof panel 28, as shown in FIGS. 5, 6, and 7. The end portions 22$c$, 24$c$, and 26$c$ toward the interior of these top wall sections 22$b$, 24$b$, and 26$b$ are bent upward nearly perpendicularly to form a frame of flange, the entire circumference thereof being equipped with a weather strip 30 in order to prevent the fallen rain water from entering the interior of the automobile. The sealing function of the weather strip 30 is accomplished by bringing its main sealing section 30$a$ into contact under pressure with the bottom surface of the roof panel 28 as shown in the figures. Desirably the outer surface 30$b$ of the installment section of the weather strip 30 is sloped as shown in the figures, the reason being to have the outer surface 30$b$ of the installment section function as a deflector in order to prevent the wind throb phenomenon when the roof panel 28 is removed as shown in FIG. 8.

Furthermore, installing brackets 32 and 34 are provided on the interior side of the front roof rail 22 and the rear roof rail 26 to have the roof panel 28 fixed onto the roof rails 22, 24, and 26 by hooking a plurality of catch handles 36 and 38 which are provided on the bottom surface of the roof panel 28 to the installing rackets 32 and 34. According to the installation structure described in the foregoing, it becomes possible to increase the area of the sun roof at will, and as well to have a construction that allows the roof panel to be removable as a single unit as in the embodiment described above.

In addition, in this method of fixing the roof panel 28, the clatter of the roof panel 28 may be eliminated due to the fact that the end rubber 40 provided along the entire periphery of the roof panel 28 makes an elastic contact with the top wall sections 22$b$, 22$b$, and 26$b$ of each rails 22, 24, and 26.

In summary, according to the present invention which allows the removal of the entire roof panel, it is possible to enjoy a relaxed feeling of wide openness when the roof panel is demounted. Also, it is possible to make the roof structure relatively inexpensive since the required modification to the form of the usual roof rail is only slight structurally. In addition, there exists such an advantage as to be able to insure a sufficient head clearance due to the circumstance that the projection of the roof frame from the bottom surface of the roof panel may be eliminated.

Various modifications will become possible for those skilled in the art after receiving the teachings of the present disclosure without departing from the scope thereof.

What is claimed is:

1. A roof structure of a vehicle which includes a front roof rail, side roof rails, and a rear roof rail, comprising:

a frame flange which protrudes from the top surfaces of the front, rear, and side roof rails;

a roof panel detachably installed on the front, rear, and side roof rails;

an elastic member attached around said frame flange, said elastic member making thereby a snug contact with a bottom surface of said roof panel; and means for fixing said roof panel onto the front, rear, and side roof rails, said fixing means comprising installing brackets which are provided on the interior side of the front and rear roof rails, and a plurality of catch handles which are provided on the bottom surface of said roof panel to be hooked to the installing brackets.

2. A roof structure as claimed in claim 1, in which said frame flange is formed by bending upward nearly perpendicularly from the interior portions of the top surfaces of the front, rear, and side roof rails.

3. A roof structure as claimed in claim 1, in which said elastic member is a weather strip which include a main sealing section coming into contact with the bottom surface of said roof panel, and an installment section having a sloped outer surface.

* * * * *